United States Patent
Durham et al.

(10) Patent No.: US 7,653,727 B2
(45) Date of Patent: Jan. 26, 2010

(54) COOPERATIVE EMBEDDED AGENTS

(75) Inventors: David M. Durham, Hillsboro, OR (US);
Vincent J. Zimmer, Federal Way, WA (US); Carey W. Smith, Hillsboro, OR (US); Raj Yavatkar, Portland, OR (US); Travis T. Schluessler, Hillsboro, OR (US); Dylan C. Larson, Portland, OR (US); Carlos V. Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 10/809,316

(22) Filed: Mar. 24, 2004

(65) Prior Publication Data

US 2005/0216577 A1  Sep. 29, 2005

(51) Int. Cl.
*G06F 15/173* (2006.01)
*G06F 9/00* (2006.01)
*G06F 9/24* (2006.01)
*G06F 15/177* (2006.01)

(52) U.S. Cl. .......................... 709/225; 713/1
(58) Field of Classification Search ....................... None
See application file for complete search history.

(56) References Cited

U.S. PATENT DOCUMENTS

| | | | |
|---|---|---|---|
| 5,602,918 A | 2/1997 | Chen et al. | |
| 5,978,912 A | 11/1999 | Rakavy et al. | |
| 6,243,809 B1 | 6/2001 | Gibbons et al. | |
| 6,282,645 B1* | 8/2001 | Yamaki | 713/100 |
| 6,405,320 B1* | 6/2002 | Lee et al. | 713/300 |
| 6,408,387 B1 | 6/2002 | Wells | |
| 6,484,262 B1* | 11/2002 | Herzi | 726/34 |
| 6,581,159 B1 | 6/2003 | Nevis et al. | |
| 6,782,474 B1 | 8/2004 | Ylonen | |
| 6,792,556 B1* | 9/2004 | Dennis | 714/6 |
| 6,886,102 B1 | 4/2005 | Lyle | |
| 7,225,325 B2 | 5/2007 | Rhoades | |
| 7,318,173 B1* | 1/2008 | Falik et al. | 714/36 |
| 7,506,149 B2* | 3/2009 | Rothman et al. | 713/2 |
| 2001/0052069 A1* | 12/2001 | Sekiguchi | 713/2 |
| 2002/0163920 A1 | 11/2002 | Walker et al. | |
| 2002/0164035 A1 | 11/2002 | Yokota et al. | |
| 2003/0037244 A1 | 2/2003 | Goodman et al. | |

(Continued)

FOREIGN PATENT DOCUMENTS

EP  1387522  2/2004

(Continued)

OTHER PUBLICATIONS

International Application No. PCT/US2005/008975 International Search Report & Written Opinion dated Jul. 7, 2005.

(Continued)

*Primary Examiner*—Ario Etienne
*Assistant Examiner*—Ho Shiu
(74) *Attorney, Agent, or Firm*—Blakely, Sokoloff, Taylor & Zafman LLP

(57) ABSTRACT

Cooperative embedded agents as well as manageability and security operations that can be performed on a host system having cooperative embedded agents are disclosed.

70 Claims, 8 Drawing Sheets

U.S. PATENT DOCUMENTS

| | | | |
|---|---|---|---|
| 2003/0097558 | A1 | 5/2003 | England et al. |
| 2003/0097581 | A1 | 5/2003 | Zimmer |
| 2003/0174703 | A1 | 9/2003 | Relan |
| 2003/0188179 | A1 | 10/2003 | Challener et al. |
| 2004/0039924 | A1 | 2/2004 | Baldwin et al. |
| 2004/0111633 | A1* | 6/2004 | Chang .................. 713/200 |
| 2004/0225885 | A1 | 11/2004 | Grohoski et al. |
| 2005/0076228 | A1 | 4/2005 | Davis et al. |
| 2005/0166213 | A1 | 7/2005 | Cromer et al. |
| 2005/0201554 | A1 | 9/2005 | Kramer et al. |
| 2005/0204155 | A1 | 9/2005 | Ravi et al. |

FOREIGN PATENT DOCUMENTS

| | | |
|---|---|---|
| WO | WO-0113198 | 2/2001 |

OTHER PUBLICATIONS

International Application No. PCT/US2005/008975 International Preliminary Report on Patentability (IPRP Ch. 1) dated Oct. 5, 2006.

Baugher, et al., "MSEC Group Key Management Architecture", <draft-ietf-msec-gkmarch-o6.txt> IETF Standard-Working-Draft, Internet Engineering Task Force, IETF, CH, vol. msec, No. 6, Sep. 8, 2006 pp. 1-35.

Matthew M. Williamson, "Throttling Viruses: Restricting Propagation to Defeat Mailicious Mobile Code", Information Infrastructure Laboratory, HP Laboratories Bristol, HPL-2002-172, Jun. 17, 2002, pp. 1-7, Hewlett-Packard Company.

Matthew M. Williamson, "Throttling Viruses: Restricting Propagation to Defeat Mailicious Mobile Code", Information Infrastructure Laboratory, HP Laboratories Bristol, HPL-2002-172 (R.1), Dec. 10, 2002, ACSAC Conference-Las Vegas, NV, pp. 1-9, Hewlett-Packard Company.

J. Twycross & M.M. Williamson, "Implementing and Testing A Virus Throttle", Trusted Systems Laboratory, HP Laboratories Bristol, HPL-2003-103, May 21, 2003, pp. 1-11, Proceedings 12th USENIX Security Symposium—Aug. 4-8, 2003 in Washington, D.C., Hewlett-Packard Company.

Matthew M. Williamson, "Design, Implementation and Test of an Email Virus Throttle", Information Infrastructure Laboratory, HP Laboratories Bristol, HPL-2003-118, Jun. 30, 2003, pp. 1-10, Hewlett-Packard Company.

M.M. Williamson et al., "Virus Throttling", Virus Bulletin, Mar. 2003, pp. 8-11, Virus Bulletin Ltd, The Pentagon, Abingdon, Oxfordshire, OX14 3YP, England.

M.M. Williamson et al., "Virus Throttling for Instant Messaging", Digital Media Systems Laboratory, HP Laboratories Bristol, HPL-2004-81, May 5, 2004, pp. 1-10, Virus Bulletin Conference of Sep. 2004 in Chicago, IL, Hewlett-Packard Company.

Int'l Search Report & Written Opinion for Int'l Application No. PCT/US2005/008616 mailed Apr. 10, 2006, 15 pgs.

Final Office Action for U.S. Appl. No. 10/809,315 mailed Dec. 21, 2007, 19 pgs.

Non-Final Office Action for U.S. Appl. No. 10/809,315 mailed Jul. 2, 2008, 16 pgs.

Office Action for U.S. Appl. No. 10/976,592 mailed Jun. 16, 2008, 23 pgs.

Translation of Preliminary Rejection for Korean Patent Application No. 10-2006-7019627 mailed Nov. 20, 2007, 2 pgs.

Office Action for European Patent Application No. 05 725 651.3-2211 mailed Dec. 18, 2007, 5 pgs.

"42P19298EP OA Mailed Apr. 24, 2009 for EP Application No. 05725651.3", (Apr. 24, 2009), Whole Document.

USPTO, "Notice of Allowance, U.S. Appl. No. 10/976,592, Mailed May 13, 2009.", Whole Document.

Office Action for Chinese Patent Application No. 200580006193.0 mailed Feb. 6, 2009, 82 pgs.

Non-Final Office Action for U.S. Appl. No. 10/809,315 mailed Dec. 8, 2008, Whole Document.

Final Office Action for U.S. Appl. No. 10/976,592 mailed Dec. 8, 2008, Whole Document.

\* cited by examiner

COOPERATIVE EMBEDDED AGENTS

TECHNICAL FIELD

Embodiments of the invention relate to electronic systems having cooperative embedded agents. More particularly, embodiments of the invention relate to electronic systems having an embedded agent coupled to interact with various system components the communicated with another embedded agent having an independent network connection, when the embedded agents cooperate to provide manageability, security and/or other functionality to the electronic system.

BACKGROUND

Since the 386SL processor was introduced by the Intel Corporation, System Management Mode (SMM) has been available on 32-bit Intel Architecture (IA32) processors as an operation mode hidden to operating systems that executes code loaded by the basic input/output system (BIOS) or firmware. The mode is deemed "hidden" because SMM operations occur independently of the operating system (OS) and software applications.

IA32 processors are enabled to enter SMM via activation of a System Management Interrupt (SMI) signal. A similar signal called the Processor Management Interrupt (PMI) signal that is roughly analogous to the SMI signal is used for Itanium™-class processors, also available from Intel Corporation. For simplicity, both SMI and PMI signals can be referred to as xMI.

To date, most BIOS implementations that leverage the SMM capability simply register a monolithic section of code that is created during the build of the BIOS to support a specific function or set of functions particular to systems that use the BIOS. There is no provision in today's systems for the registration or execution of third-party SMM code, thus allowing no extensibility to the SMM framework. Such extensibility is often desired. For example, if the functions provided by the SMM code provided by the original equipment manufacturer (OEM) or the BIOS vendor for a given platform is insufficient, a developer or value-added reseller (VAR) has to either license the existing code from the BIOS vendor or OEM and attempt to graft their own logic into their implementation of SMM code.

In addition, today's implementations on IA32 processors are restricted to the 16-bit mode of the processor, thus limiting the size of the code and the possible leveraging of 32-bit or 64-bit software engineering techniques. In general, BIOS updates for SMM functions are problematic to effect and because the OS already has a hardware extensibility mechanism via its own driver model, BIOS vendors and OEMs are less motivated to provide these types of BIOS updates.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Figure 1:
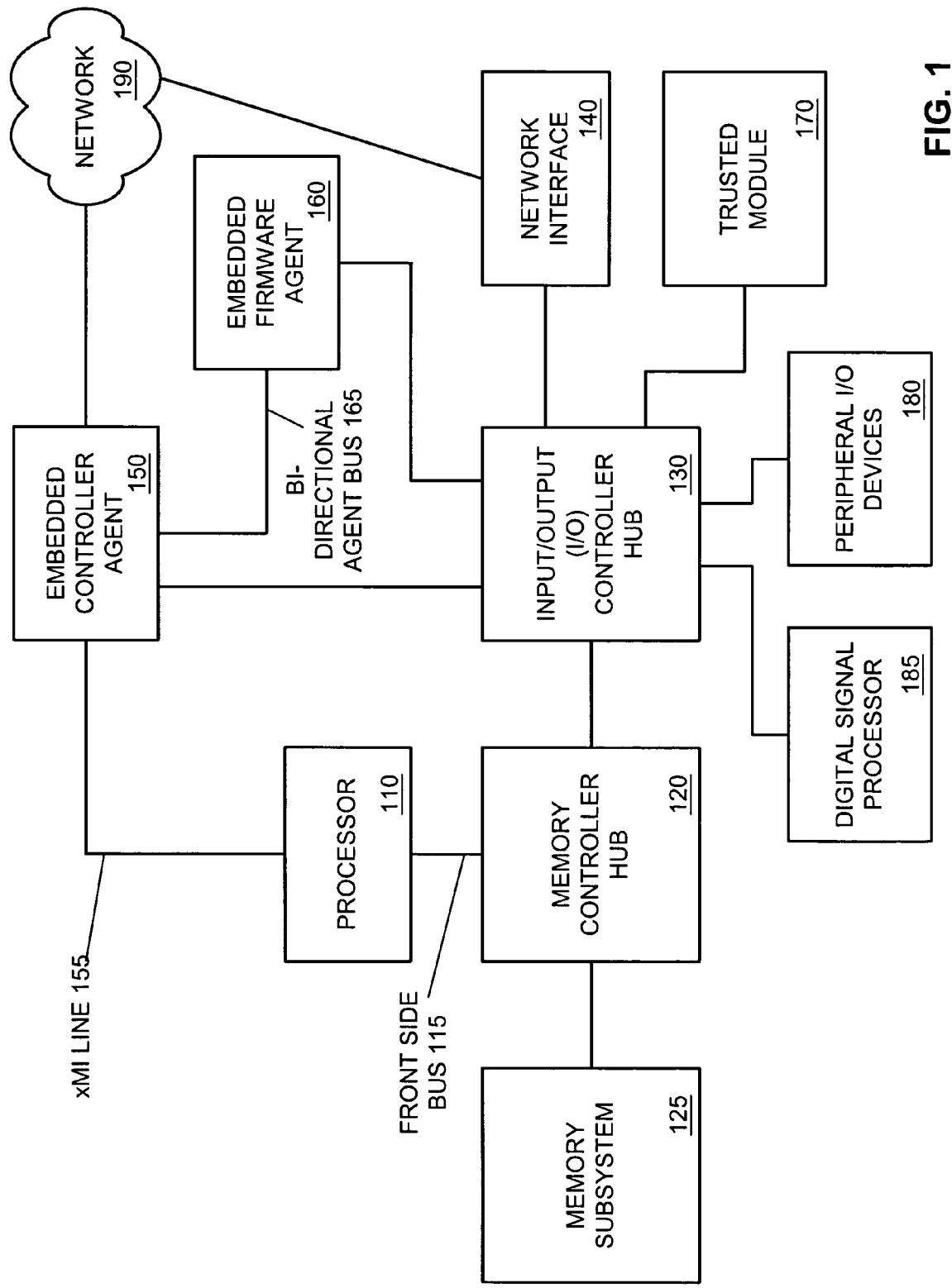
FIG. 1 is a block diagram of one embodiment of an electronic system having cooperative embedded agents.

FIG. 1 is a block diagram of one embodiment of an electronic system having cooperative embedded agents. The block diagram of FIG. 1 is intended to represent a broad category of electronic systems having network interfaces. The electronic system can be, for example, a desktop computer system, a mobile computer system, a server, a personal digital assistant (PDA), a cellular telephone, a set-top box, game console, satellite receiver, etc.

In one embodiment, processor 110 may be coupled to memory controller hub 120 by front side bus 115. While the electronic system of FIG. 1 is described as having a single processor, multiple processor embodiments can also be supported. In an alternate embodiment, processor 110 may be coupled with memory controller hub 120 by a shared system bus. Processor 110 can be any type of processor known in the art, for example, a processor from the Pentium® family of processors, the Itanium® family of processors, the Xeon® family of processors, available from Intel Corporation of Santa Clara, Calif. Other processors can also be used.

Memory controller hub 120 may provide an interface to memory subsystem 125 that can include any type of memory to be used with the electronic system. Memory controller hub 120 may also be coupled with input/output (I/O) controller hub (ICH) 130. In one embodiment, ICH 130 may provide an interface between the system and peripheral I/O devices 180 as well as between the system and network interface 140, which may provide an interface to external network 190. Network 190 may be any type of network, whether wired or wireless, for example, a local area network or a wide area network. Memory controller hub 120 may also be coupled with digital signal processor 185.

In one embodiment, ICH 130 may be coupled with trusted module 170, which may provide security and/or cryptographic functionality. In one embodiment, trusted module 170 may be implemented as a trusted platform module (TPM) is described in greater detail below. Trusted module 170 may provide a secure identifier, for example, a cryptographic key in a secure manner to ICH 130 or other system component.

Embedded controller agent 150 may be coupled with ICH 130 and with network 190. The network connection for embedded controller 150 may be independent of the operation of the system and is independent of an operating system executed by processor 110. In one embodiment, embedded controller agent 150 may include a microcontroller or other type of processing circuitry, memory and interface logic. One embodiment of embedded controller agent 150 is described in greater detail below.

In one embodiment, embedded controller agent 150 may be coupled with processor 110 via an interrupt interface. For example, embedded controller agent 150 may be coupled with the SMI pin of a Pentium® processor or with the PMI pin of an Itanium® processor (generically, xMI line 155). Other system interrupt signals may be used for other processors.

ICH 130 may also be coupled with embedded firmware agent 160. In one embodiment, embedded firmware agent 160 may be a mechanism that enables executable content in the form of one or more software drivers to be loaded into the System Management Mode (SMM) of an Intel 32-bit family of microprocessor (i.e., IA-32 processors), or the native mode of an Itanium-based processor with a PMI signal activation. The state of execution of code in IA32 SMM is initiated by an SMI signal and that in Itanium™ processors is initiated by a PMI signal activation; for simplicity, these will generally be referred to as SMM.

In one embodiment, embedded firmware agent 160 may allow for multiple drivers, possibly written by different parties, to be installed for SMM operation. An example of an agent that may register the drivers runs in an Extensible Firmware Interface (EFI) boot-services mode (i.e., the mode prior to operating system launch) and may be composed of a processor-specific component that binds the drivers and a platform component that abstracts chipset control of the xMI (PMI or SMI) signals.

In one embodiment, code stored in embedded firmware agent 160 may be copied to a memory component of memory subsystem 125 during startup of the host system. For example, in an architecture supporting SMM operation, code to be used during SMM may be shadow copied to a SMRAM portion of memory subsystem 125. When operating in SMM, processor 110 may execute instructions stored in SMRAM.

In one embodiment, embedded controller agent 150 may be coupled with embedded firmware agent 160 via bi-directional agent bus 165. By communicating over bi-directional agent bus 165, embedded controller agent 150 and embedded firmware agent 160 may be configured to provide manageability and/or security functionality to the system.

In one embodiment, embedded controller agent 150 may provide an integrity check on the system for security purposes, for example, prior to establishing a secure or trusted connection with a remote device via network 190. Embedded controller agent may perform a virus scan of the system to determine whether communication with the remote device is safe and/or whether support is required from the remote device. Embedded firmware agent 160 may provide an operating system-independent, secure storage for use by embedded controller agent 150 in performing the integrity check.

During operation, embedded controller agent 150 may perform periodic integrity checks to provide enhanced security as compared to a single integrity check. Embedded controller agent 150 can also perform integrity checks prior to communication with remote management devices. Other example, uses of bi-directional communications between embedded controller agent 150 and embedded firmware agent 160 are described below.

In the description of FIG. 1, embedded controller agent 150, embedded firmware agent 160 and bi-directional agent bus 165 are described in terms of separate system elements. In a physical implementation, embedded controller agent 150, embedded firmware agent 160 and bi-directional agent bus 165 may be logical components of one or more components. Bi-directional agent bus 165 may be any communication mechanism or messaging interface that may allow bi-directional communication between the functional components of embedded controller agent 150 and embedded firmware agent 160.

The operation of embedded controller agent 150, and embedded firmware agent 160 as described herein to provide functionality for the host system may be accomplished prior to loading to the host operating system and/or after the host operating system has been loaded. Thus, the architecture described herein provides a broad range of manageability and/or security functionality.

Figure 2:
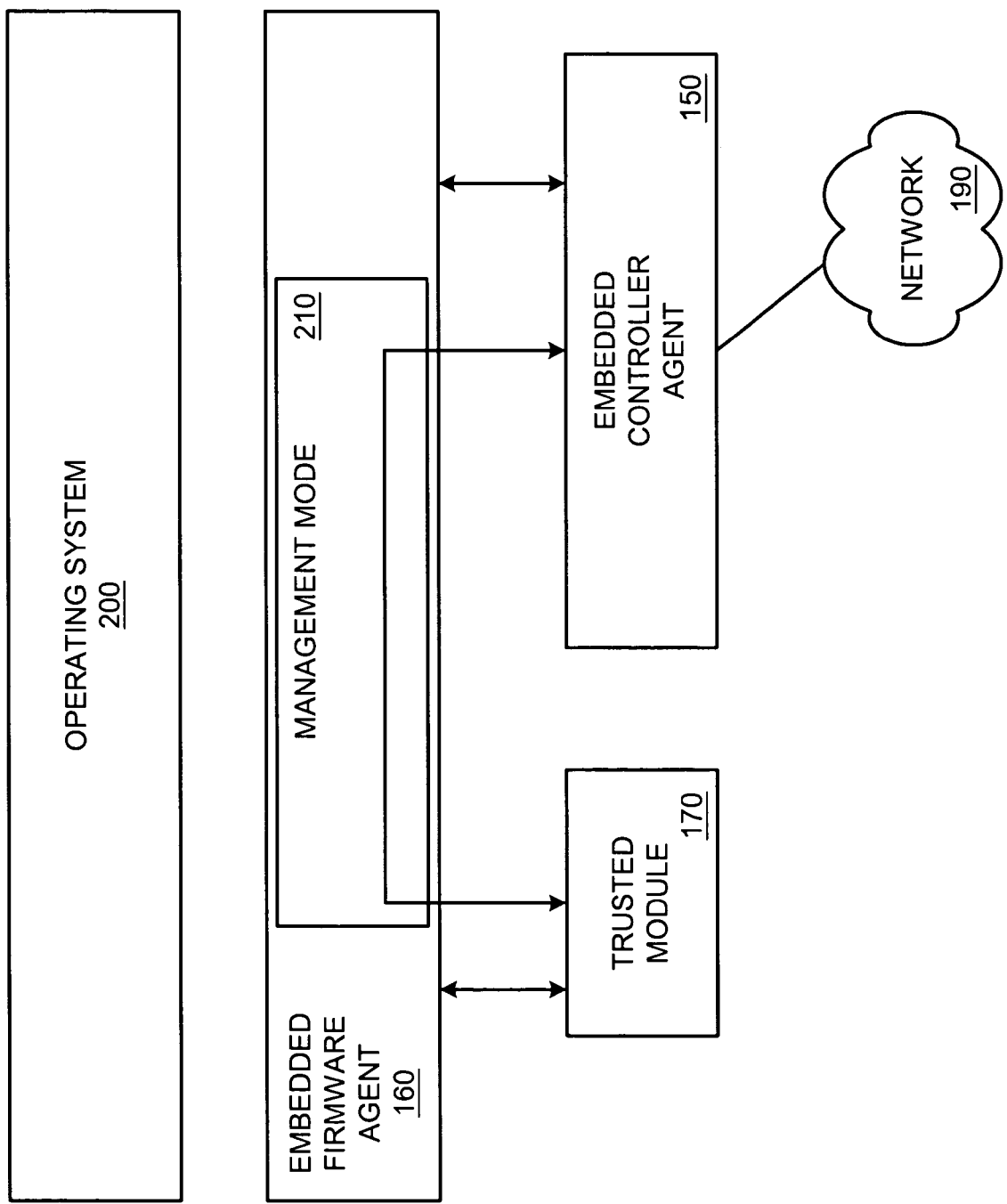
FIG. 2 is a conceptual block diagram of one embodiment of interaction between an embedded controller agent, an embedded firmware agent and a trusted module.

FIG. 2 is a conceptual block diagram of one embodiment of interaction between an embedded controller agent, an embedded firmware agent and a trusted module. When embedded controller agent 150 initiates or responds to communication with a remote device over network 190, embedded controller agent 150 may initiate management mode 210 by asserting a xMI signal as described above. Using the Intel processors, management mode 210 may correspond to System Management Mode (SMM). Using other processors, other management modes may be used. Because management mode 210 is used for operations by embedded controller agent 150, these operations can be performed independently of operating system 200.

In one embodiment, when embedded controller agent 150 invokes management mode 210, embedded firmware agent 160 provides an interrupt service routine to perform operations requested by embedded controller agent 150. In one embodiment, embedded firmware agent 160 is an EFI device that allows interrupt handling routines to be written and stored in memory, for example, a flash memory accessible to embedded firmware agent 160, to be used in response to xMI signals from embedded controller agent 150.

Upon invoking management mode 210, embedded controller agent 150 may perform manageability and/or security operations independent of operating system 200. If, for example, embedded controller agent 150 is engaged in secure communications with a remote device across network 190, embedded controller agent 150 can communicate with trusted module 170 in management mode 210 to authenticate the system to which embedded controller agent 150 belongs. Because the authentication is independent of operating system 200, embedded controller agent 150 is insulated from viruses and/or security attacks that involve operating system 200.

In one embodiment, management mode operations are offloaded to embedded controller 150 in order to share processing resources with operating system 200. For example, most Windows® operating systems available from Microsoft Corporation use timers to check execution of instructions and when too much time has elapsed (e.g., 200 ms) since the last instruction, a debug or fault operation may be invoked. By offloading management mode operations, embedded controller agent 150 can periodically assert xMI signals while performing operations to, for example, access system resources such as, for example, data from trusted module 170.

Figure 3:
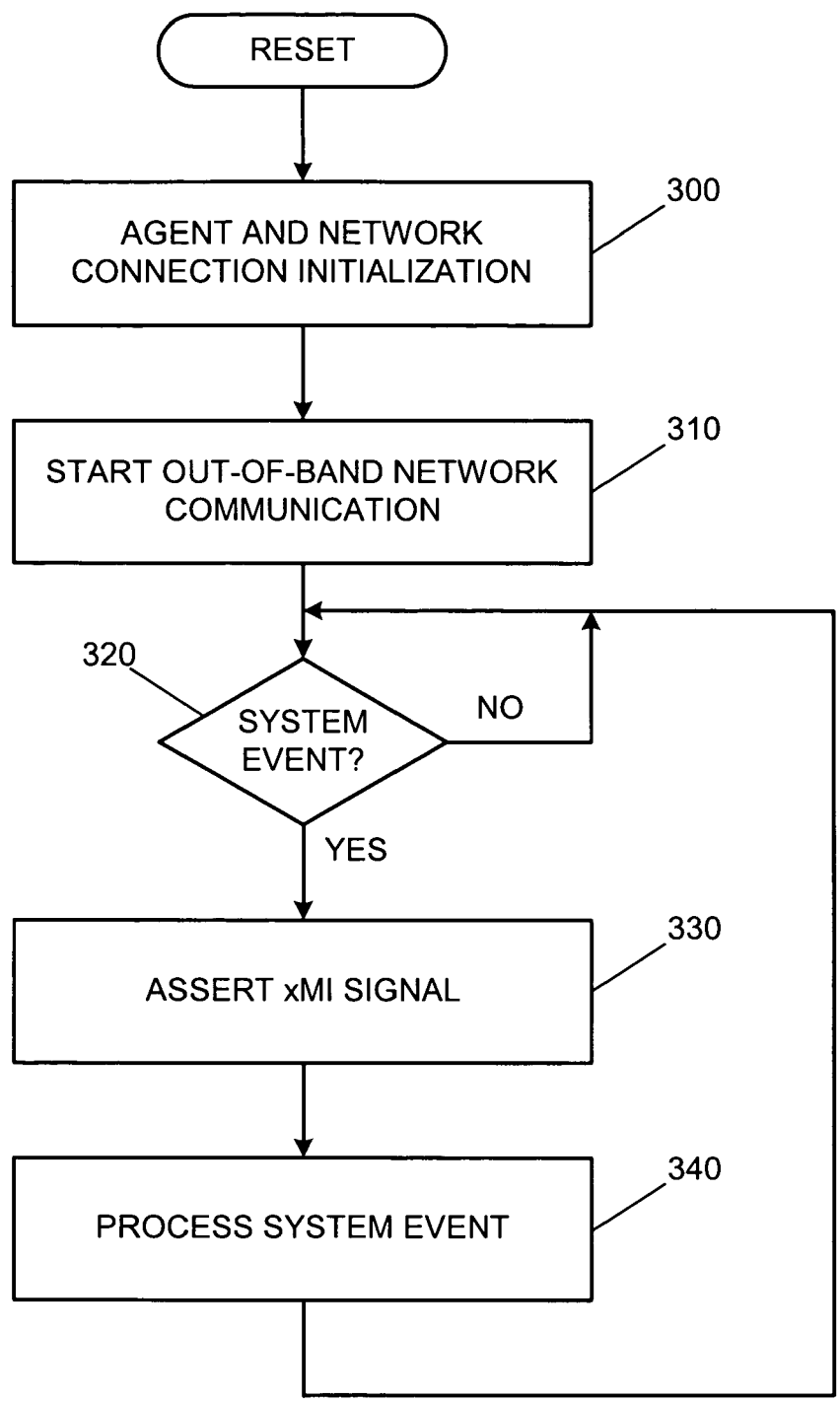
FIG. 3 is a flow diagram of one embodiment of operation of an embedded controller agent.

FIG. 3 is a flow diagram of one embodiment of operation of an embedded controller agent. In response to a reset, the embedded controller agent may perform initialization procedures and initializes a network connection, 300. The agent initialization may include any operations that may be necessary to prepare the agent for operation. These operations may include, for example, retrieving instructions from a read-only memory or flash memory having initialization instructions for the agent.

In one embodiment, upon completion of the initialization procedures, the agent may start an out-of-band network communication, 310. The network communication is referred to as out-of-band because the network communications of the embedded controller agent are independent of the operating system executing on the system in which the embedded controller agent resides. The out-of-band network communication may include, for example, operations related to registration of the host system in a network, manageability operations in response to a remote network node, security operations, etc.

In one embodiment, the embedded controller agent may wait for a system event, 320. A system event may be any type of event that is related to operations to be performed independently of the operating system. For example, if the host operating system has been the victim of a virus or a Trojan horse, a system event may be triggered by virus detection software to retrieve a virus elimination program or to disable the system network connection to prevent spread of the virus or Trojan horse.

In response to the system event, the embedded controller agent may assert the xMI signal (for Intel® processors), 330. Assertion of the xMI signal may cause the processor to enter SMM in which the operating system relinquishes control of the host system to a SMM interrupt handler that may be stored in, for example, system management memory that is not accessible to the operating system. The system event may be processed, 340.

Figure 4:
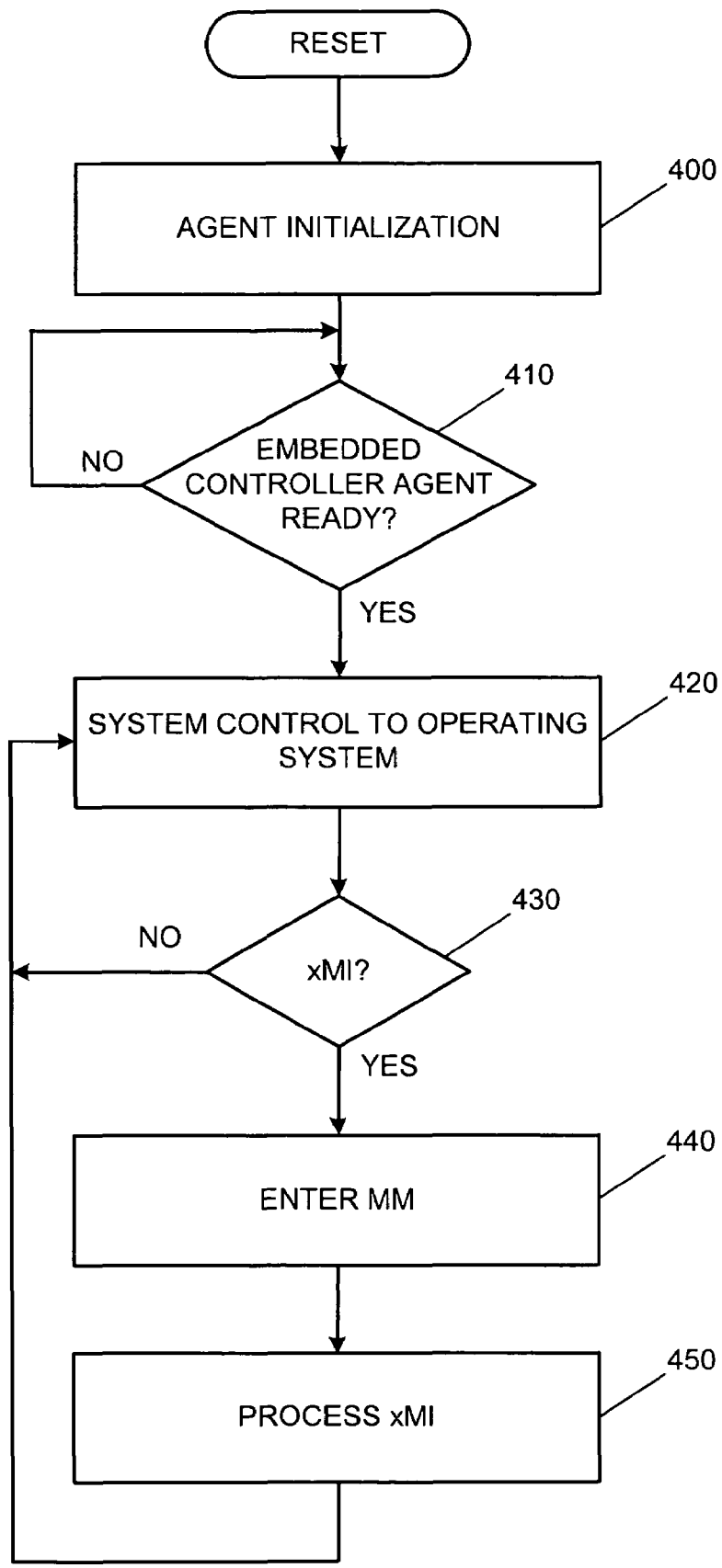
FIG. 4 is a flow diagram of one embodiment of operation of an embedded firmware agent.

FIG. 4 is a flow diagram of one embodiment of operation of an embedded firmware agent. In response to a reset, the embedded controller agent may perform initialization procedures, 400. One embodiment of an initialization procedure is described in greater detail below with respect to FIG. 5.

In one embodiment, the embedded firmware agent may determine if the embedded controller agent is ready, 410. In one embodiment, the embedded controller agent may indicate the completion of initialization to the embedded firmware agent via the bi-directional agent bus. In one embodiment, when both the embedded firmware agent and the embedded controller agent are initialized, control of the host system may be given to the host operating system, 420.

By allowing both the embedded firmware agent and the embedded controller agent to complete initialization prior to passing control of the host system to the host operating system, security, manageability and/or other functionality can be performed prior to granting control to the host operating system. If a xMI occurs, 430, the host system may enter Management Mode (MM), 440. While in MM, the embedded controller agent, the embedded firmware agent and/or the trusted module may operate to process the xMI, 450.

Figure 5:
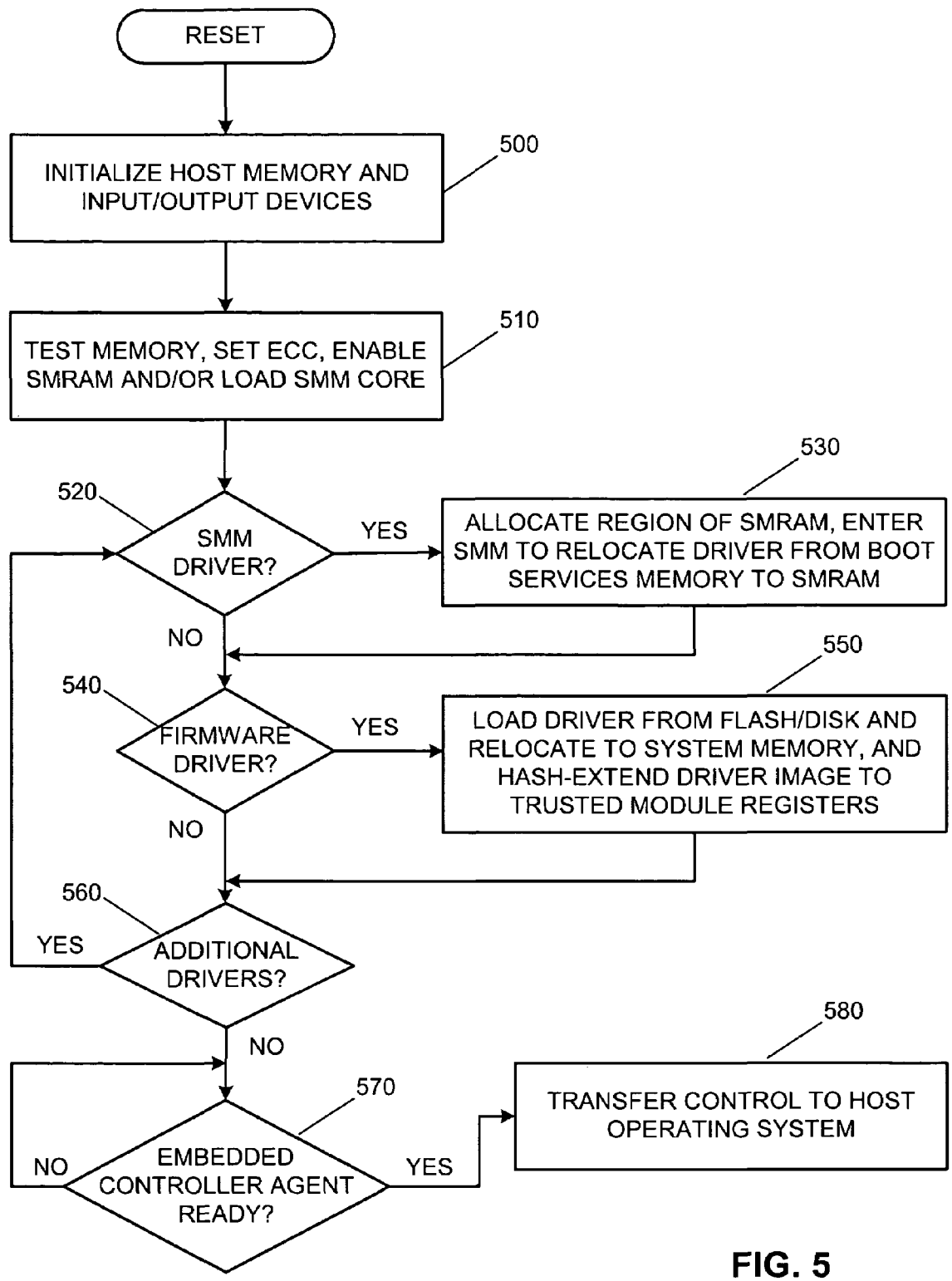
FIG. 5 is a flow diagram of one embodiment, of an initialization process for the embedded firmware agent.

FIG. 5 is a flow diagram of one embodiment, of an initialization process for the embedded firmware agent. The example of FIG. 5 recites specific operations that are related to SMM operations using Intel® processors; however, other processors supporting similar functionality can also be used.

In response to a reset condition, the embedded firmware agent may initialize host memory an one or more input/output (I/O) devices, 500. In one embodiment, this initialization may be part or all of the initialization operations traditional performed by basic input/output system (BIOS). In one embodiment, after initialization of the memory, the embedded firmware agent may test memory, set an error correcting code (ECC), enable System Management Memory (SMRAM) and/or load the core of the system management code (SMM core), 510.

In one embodiment, if the embedded firmware agent detects a SMM driver, 520, the embedded firmware agent may allocate a region of SMRAM for the SMM driver and then may enter SMM to relocate the SMM driver from boot services memory to SMRAM. If the embedded firmware agent does not detect a SMM driver, 520, the embedded firmware agent may check for a firmware driver, 540.

In one embodiment, if the embedded firmware agent detects a firmware driver, 540, the embedded firmware agent may load the driver from disk or flash memory and relocate the driver to system memory and may hash-extend the trusted module registers (e.g., a trusted platform module (TPM) platform configuration registers (PCR)), 550. If the embedded firmware agent does not detect a firmware driver, 540, the embedded firmware agent may check for additional drivers, 560.

In one embodiment, if the embedded firmware agent detects additional drivers, 560, the embedded firmware agent may return to checking the additional driver to determine if the additional driver is a SMM driver, 520. If the embedded firmware agent does not detect additional drivers, 560, the embedded firmware agent may determine whether the embedded controller agent is ready, 570. If the embedded controller agent is ready, 570, the embedded firmware agent may transfer control to the host operating system, 580.

The interaction of the embedded firmware agent, the embedded controller agent and/or the trusted module can provide one or more of the manageability and/or security features described below. The list of features that follows is a list of examples and not intended to be an exhaustive listing of the features that can be provided with the embedded firmware agent, the embedded controller agent and the trusted module as described herein.

Flash memory that may be included in the embedded firmware agent, the embedded controller, the trusted module and/or the host system can be updated in a secure manner using the techniques described herein. Because the updates can be provided to the embedded controller from a remote device without operating system interaction, the updates can be provided even when the operating system is not functioning properly and additional security can be provided because attacks involving the operating system. Remote updates can provide an efficient technique for updating flash memory at multiple client devices.

In one embodiment, the embedded controller agent may monitor operation of the operating system and modify security policies based on the condition or mode of the operating system. For example, a first security policy may be applied when the operating system is running and a second security policy may be applied when the host system is in SMM.

The embedded controller agent, the embedded firmware agent and/or the trusted module may provide monitoring and logging of the host system that is independent of, or different that, monitoring provided by the operating system. For example, the embedded controller agent and the embedded firmware agent may monitor processor performance counters and processor load and, if preset thresholds are crossed, a message may be sent to a remote device via the network connection of the embedded controller agent.

The embedded controller agent, embedded firmware agent and/or the trusted module may provide support for a host protected area (HPA) of the host disk drive. The HPA may be used for credential storage, large log filed, etc. By having access to the trusted module and the increased cryptograph functionality provided by the trusted module, the embedded controller agent, the embedded firmware agent and the trusted module may function together to provide mutual authentication functionality for network communication.

In one embodiment, pre-boot execution environment (PXE) operations may be offloaded from a host processor to the embedded controller agent and/or embedded firmware agent. Also, PXE discovery of a PXE server may be performed by the embedded firmware agent, the embedded controller agent and/or the trusted module.

Mutual authentication using, for example Secure Sockets Layer (SSL) sessions may be accomplished by using authentication functionality provided by the trusted module to provide authentication to the server. In one embodiment, security operations, for example, virus scans, may be performed prior to the embedded firmware agent transferring control of the host system to the host operating system. If a virus is detected, the embedded controller agent may interact with a remote device using the network connection of the embedded controller agent to respond to the detected virus.

In one embodiment, the embedded controller agent may use an extensible markup language digital signature (XML DSIG) to send secure messages to remote devices via the independent network connection. The embedded controller agent can interact with the trusted module via the embedded firmware agent in SMM to provide cryptographic operations. These security operations are independent of the host system operating system and therefore may be used to authenticate the host system.

Figure 6:
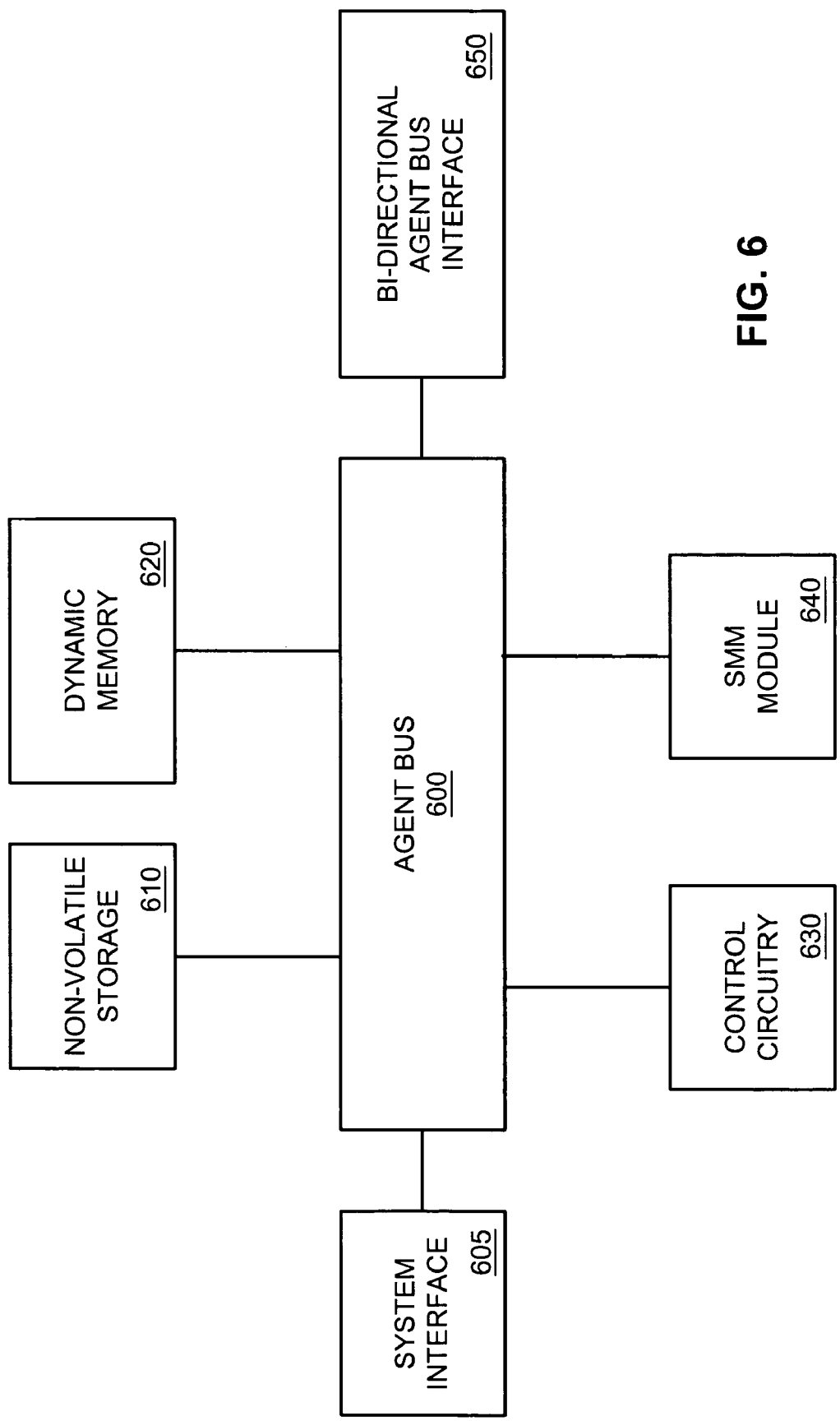
FIG. 6 is a block diagram of one embodiment of an embedded firmware agent.

FIG. 6 is a block diagram of one embodiment of an embedded firmware agent. In the example of FIG. 6 the embedded firmware agent may be an Extensible Firmware Interface (EFD) as defined by the EFI Specifications, version 1.10, published Nov. 26, 2003, available from Intel Corporation of Santa Clara, Calif. In alternate embodiments, other firmware components can also be used.

In one embodiment, the embedded firmware agent may include agent bus 600 coupled with system interface 605. System interface 605 may provide an interface through which the embedded firmware agent communicates with the host system. The embedded firmware agent may further include bi-directional agent bus interface 650 that may be coupled with bus 600 to allow the embedded firmware agent to communicate with an embedded controller agent as described above.

In one embodiment, the embedded firmware agent further includes dynamic memory 610 that may be coupled with agent bus 600. Dynamic memory 610 may provide storage for instructions and/or data to be used during operation. The embedded firmware agent may further include non-volatile storage 620 that may be coupled with agent bus 600 to store static data and/or instructions.

In one embodiment, the embedded firmware agent may include control circuitry 630 coupled with agent bus 600 that may perform control operations and/or execute instructions provided by dynamic memory 610 and/or non-volatile storage 620. The imbedded firmware agent may also include SMM module 640 coupled with agent bus 600. SMM module 640 can be any combination of elements that provide SMM functionality to the host system. For example, when in SMM, the embedded firmware agent may provide SMI handling operations based on data and/or instructions stored in dynamic memory 610 and/or non-volatile storage 620.

In one embodiment, control circuitry 630 is selectively activated during SMM. That is, when the host system is not in SMM, control circuitry 630 can be idle, or even in an inactive state. In one embodiment, the embedded firmware agent has access to all of the memory in the host system. This includes, for example, SMRAM, HPA, and possibly other memory regions that have access restrictions.

Figure 7:
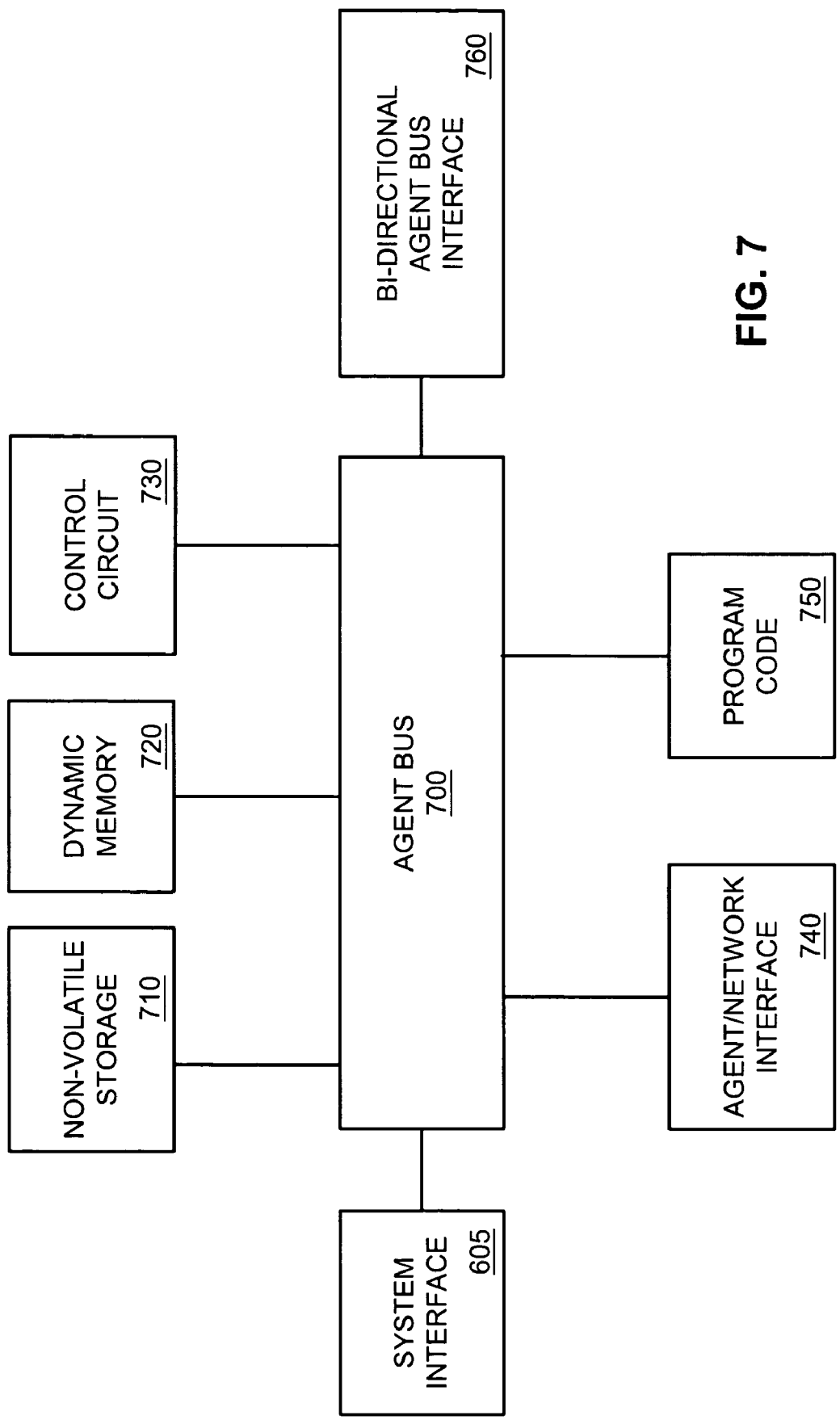
FIG. 7 is a block diagram of one embodiment of an embedded controller agent.

FIG. 7 is a block diagram of one embodiment of an embedded controller agent. In the example of FIG. 7 the embedded controller agent may be a microcontroller based system component that can operate as described herein. In alternate embodiments, other controller components can also be used.

In one embodiment, the trusted module may include agent bus 700 coupled with system interface 705. System interface 705 may provide an interface through which the embedded controller agent communicates with the host system. The embedded controller agent may further include bi-directional agent bus interface 760 that may be coupled with bus 700 to allow the embedded controller agent to communicate with an embedded firmware agent as described above.

In one embodiment, the embedded controller agent further includes dynamic memory 710 that may be coupled with agent bus 700. Dynamic memory 710 may provide storage for instructions and/or data to be used during operation. The embedded controller agent may further include non-volatile storage 720 that may be coupled with agent bus 700 to store static data and/or instructions.

In one embodiment, the embedded controller agent may include control circuitry 730 coupled with agent bus 700 that may be implemented as a microcontroller perform control operations and/or execute instructions provided by dynamic memory 710 and/or non-volatile storage 720. Any type of microcontroller known in the art, or similar control circuitry, can be used.

The imbedded controller agent may also include agent/network interface 740 coupled with agent bus 700. Agent/network interface 740 may provide a network connection for the embedded controller agent that is independent of the operating system and the network interface of the host system. Agent/network interface 740 may allow the embedded controller agent to communicate with remote devices independent of the operating system of the host system. This allows the embedded controller agent to perform manageability, security and/or other functions in a more secure and transparent manner as compared to similar operations performed under operating system control.

In one embodiment, control circuitry 730 is not placed in an inactive state. This allows control circuitry 730 and the embedded controller agent to respond to internal and external events. In one embodiment, the embedded controller agent does not have access to all of the memory of the host system. In such an embodiment, memory accesses and/or execution of instructions that rely on protected memory regions may be accessed by the embedded firmware agent.

Figure 8:
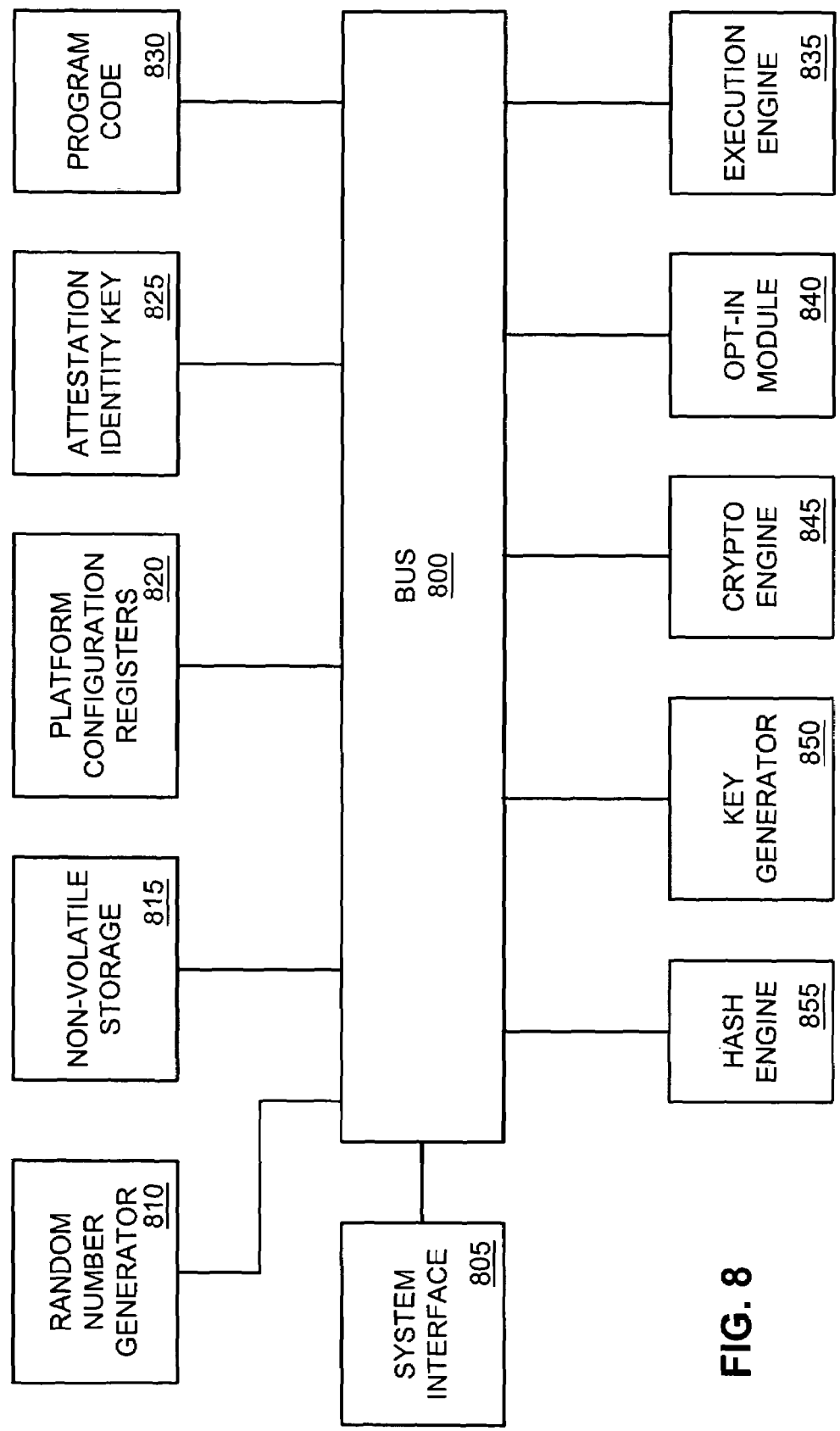
FIG. 8 is a block diagram of one embodiment of a trusted module.

FIG. 8 is a block diagram of one embodiment of a trusted module. In the example of FIG. 8 the trusted module may be a Trusted Platform Module (TPM) as defined by the TPM Specifications, version 1.2, published Oct. 2, 2003, available from the Trusted Computing Group of Portland, Oreg. In alternate embodiments, other implementations of the trusted module, for example, a secure storage device, can be used to provide support for security operations.

In one embodiment, the trusted module may include bus 800 coupled with system interface 805. System interface may provide an interface through which the trusted module communicates with the host system. The trusted module may include random number generator 810 coupled with bus 800 to generate random numbers for cryptographic operations and non-volatile storage 815 coupled with bus 800 to store data and/or instructions for use in operation of the trusted module.

The trusted module may further include platform configuration registers 820, which may used to store protected information related to the integrity of the host system. In one embodiment, the trusted module also includes a storage component coupled with bus 800 to store attestation identity key (AIK) 825. In one embodiment, AIK 825 may be a 2048-bit RSA key that can be used to digitally sign information generated by the trusted module and/or the host system. Other AIK configurations can also be used.

Program code 830 may be stored in memory, either volatile or non-volatile, coupled with bus 800. Program code 830 includes instructions that cause the trusted module to operate to provide security operations. In one embodiment, execution engine 835 is coupled with bus 800 to execute program code 830. The trusted module may further include opt-in module 840 that allows a user of the host system to enable or disable operation of the trusted module. Opt-in module 840 can be, for example, a physical switch on the host system.

In one embodiment, the trusted module may include cryptographic engine 845 coupled with bus 800 that performs cryptographic operations. Cryptographic engine 845 may be, for example, an RSA engine that performs RSA cryptographic operations. Other cryptographic protocols, for example, asymmetric cryptographic protocols, may also be supported by cryptographic engine 845. The trusted module may further include key generator 850 coupled with bus 800 that may generate one or more keys for cryptographic operations.

Hash engine 855 may also be coupled with bus 800 and may provide hashing functionality to support cryptographic operations. In one embodiment, hash engine 855 may be an SHA-1 engine and may perform Secure Hash Algorithm operations for use in security functionality provided by the trusted module. In alternate embodiments, hash engine 855 may be a DSA engine, or hash engine 855 may support any other cryptographic protocol.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    an embedded firmware agent coupled within a host system having memory to store instructions that, when executed, cause the embedded firmware agent to selectively operate in a management mode during which a host operating system relinquishes control of host system in which the embedded firmware agent resides;
    an embedded hardware controller agent coupled within the host system having memory to store instructions that cause the embedded hardware controller agent to operate independently of the host operating system and selectively invokes the management mode, the embedded hardware controller agent having a network interface to allow the embedded hardware controller agent to communicate over a network independently of the host operating system;
    a physical bi-directional agent bus coupled between the embedded firmware agent and the embedded hardware controller agent to transmit messages between the embedded firmware agent and the embedded hardware controller agent; and
    a trusted module coupled with the embedded hardware controller agent and the embedded firmware agent to provide mutual authentication with a server prior to the embedded firmware agent transferring control to the host operating system.

2. The apparatus of claim 1 further comprising a trusted module coupled with the embedded firmware agent and the embedded controller agent, the trusted module to perform cryptographic operations to support operations by the embedded controller agent.

3. The apparatus of claim 1 wherein the embedded controller agent asserts a management interrupt signal to invoke the management mode.

4. The apparatus of claim 1 wherein the embedded controller agent and the embedded firmware agent interact to provide manageability features to the host system.

5. The apparatus of claim 4 wherein the manageability features are provided prior to the host operating system being loaded.

6. The apparatus of claim 4 wherein the manageability features are provided after the host operating system has been loaded.

7. The apparatus of claim 4 wherein the manageability features are provided concurrently with loading of the host operating system.

8. The apparatus of claim 4 wherein the manageability features comprise host operating system independent update of a flash memory device via the embedded controller agent.

9. The apparatus of claim 4 wherein the manageability features comprise monitoring of host functionality and reporting to a remote device via the embedded controller agent.

10. The apparatus of claim 4 wherein the manageability features comprise providing boot services to the host system via the embedded controller agent.

11. The apparatus of claim 1 wherein the embedded controller agent and the embedded firmware agent interact to provide security features to the host system.

12. The apparatus of claim 11 wherein the security features are provided prior to the host operating system being loaded.

13. The apparatus of claim 11 wherein the security features are provided after the host operating system has been loaded.

14. The apparatus of claim 11 wherein the security features are provided concurrently with loading of the host operating system.

15. The apparatus of claim 11 wherein the security features comprise performing verification of the host system and selectively reporting results to a remote device via the embedded controller agent.

16. The apparatus of claim 11 wherein the security features comprise performing virus recovery operations via the embedded controller agent.

17. The apparatus of claim 11 wherein the security features comprise providing authentication services for the host system via the embedded controller agent.

18. The apparatus of claim 11 wherein the security features comprise providing support for mutual authentication of a network communication session.

19. A method comprising:
    invoking a management mode in a host system in which a host operating system temporarily relinquishes control of the host system with an embedded hardware controller agent coupled within the host system, the embedded hardware controller agent having memory to store instructions and capable of executing the stored instructions, the embedded hardware controller agent further having a network connection that operates independently of the host operating system; and servicing requests from the embedded hardware controller agent during the management mode with an embedded firmware agent that is coupled within the host system, the embedded firmware agent having memory to store instructions and capable of executing the stored instructions, by communicating with the embedded controller agent over a bi-directional agent bus wherein the embedded firmware agent services requests from the embedded controller agent by interacting with a trusted platform module to provide cryptographic operations, wherein the trusted platform module provides mutual authentication with a remote server prior to the host operating system obtaining control.

20. The method of claim 19 wherein invoking the management mode comprises:
asserting a management interrupt with the embedded controller agent; and
entering the management mode in response to the management interrupt.

21. The method of claim 19 wherein the embedded controller agent and the embedded firmware agent interact to provide manageability features to the host system.

22. The method of claim 21 wherein the manageability features are provided prior to the host operating system being loaded.

23. The method of claim 21 wherein the manageability features are provided after the host operating system has been loaded.

24. The method of claim 21 wherein the manageability features are provided concurrently with loading of the host operating system.

25. The method of claim 21 wherein the manageability features comprise host operating system independent update of a flash memory device via the embedded controller agent.

26. The method of claim 21 wherein the manageability features comprise monitoring of host functionality and reporting to a remote device via the embedded controller agent.

27. The method of claim 21 wherein the manageability features comprise providing boot services to the host system via the embedded controller agent.

28. The method of claim 19 wherein the embedded controller agent and the embedded firmware agent interact to provide security features to the host system.

29. The method of claim 28 wherein the security features are provided prior to the host operating system being loaded.

30. The method of claim 28 wherein the security features are provided after the host operating system has been loaded.

31. The method of claim 28 wherein the security features are provided concurrently with loading of the host operating system.

32. The method of claim 28 wherein the security features comprise performing verification of the host system and selectively reporting results to a remote device via the embedded controller agent.

33. The method of claim 28 wherein the security features comprise performing virus recovery operations via the embedded controller agent.

34. The method of claim 28 wherein the security features comprise providing authentication services for the host system via the embedded controller agent.

35. The method of claim 28 wherein the security features comprise providing support for mutual authentication of a network communication session.

36. An article comprising a computer-readable medium having stored thereon instructions that, when executed, cause one or more processing elements to:
invoke a management mode in a host system in which a host operating system temporarily relinquishes control of the host system with an embedded hardware controller agent coupled within the host system, the embedded hardware controller agent having memory to store instructions and capable of executing the stored instructions, the embedded hardware controller agent further having a network connection that operates independently of the host operating system; and
service requests from the embedded hardware controller agent during the management mode with an embedded firmware agent that is coupled within the host system, the embedded firmware agent having memory to store instructions and capable of executing the stored instructions, by communicating with the embedded hardware controller agent over a bi-directional agent bus wherein the embedded firmware agent services requests from the embedded controller agent by interacting with a trusted platform module to provide cryptographic operations, wherein the trusted platform module provides mutual authentication with a remote server prior to the host operating system obtaining control.

37. The article of claim 36 wherein the instructions that cause the one or more processing elements to invoke the management mode comprise instructions that, when executed, cause the one or more processing elements to:
assert a management interrupt with the embedded controller agent; and
enter the management mode in response to the management interrupt.

38. The article of claim 36 wherein the embedded controller agent and the embedded firmware agent interact to provide manageability features to the host system.

39. The article of claim 38 wherein the manageability features are provided prior to the host operating system being loaded.

40. The article of claim 38 wherein the manageability features are provided after the host operating system has been loaded.

41. The article of claim 38 wherein the manageability features are provided concurrently with loading of the host operating system.

42. The article of claim 38 wherein the manageability features comprise host operating system independent update of a flash memory device via the embedded controller agent.

43. The article of claim 38 wherein the manageability features comprise monitoring of host functionality and reporting to a remote device via the embedded controller agent.

44. The article of claim 38 wherein the manageability features comprise providing boot services to the host system via the embedded controller agent.

45. The article of claim 36 wherein the embedded controller agent and the embedded firmware agent interact to provide security features to the host system.

46. The article of claim 45 wherein the security features are provided prior to the host operating system being loaded.

47. The article of claim 45 wherein the security features are provided after the host operating system has been loaded.

48. The article of claim 45 wherein the security features are provided concurrently with loading of the host operating system.

49. The article of claim 45 wherein the security features comprise performing verification of the host system and selectively reporting results to a remote device via the embedded controller agent.

50. The article of claim 45 wherein the security features comprise performing virus recovery operations via the embedded controller agent.

51. The article of claim 45 wherein the security features comprise providing authentication services for the host system via the embedded controller agent.

52. The article of claim 45 wherein the security features comprise providing support for mutual authentication of a network communication session.

53. A system comprising:

a bus;

a digital signal processor coupled with the bus;

an embedded firmware agent coupled within a host system having memory to store instructions that, when executed, cause the embedded firmware agent to selectively operate in a management mode during which a host operating system relinquishes control of host system in which the embedded firmware agent resides;

an embedded hardware controller agent coupled within the host system having memory to store instructions that cause the embedded hardware controller agent to operate independently of the host operating system and selectively invokes the management mode, the embedded hardware controller agent having a network interface to allow the embedded hardware controller agent to communicate over a network independently of the host operating system;

a physical bi-directional agent bus coupled between the embedded firmware agent and the embedded hardware controller agent to transmit messages between the embedded firmware agent and the embedded hardware controller agent; and a trusted module coupled with the embedded hardware controller agent and the embedded firmware agent to provide mutual authentication with a server prior to the embedded firmware agent transferring control to the host operating system.

54. The system of claim 53 further comprising a trusted module coupled with the embedded firmware agent and the embedded controller agent, the trusted module to perform cryptographic operations to support operations by the embedded controller agent.

55. The system of claim 53 wherein the embedded controller agent asserts a management interrupt signal to invoke the management mode.

56. The system of claim 53 wherein the embedded controller agent and the embedded firmware agent interact to provide manageability features to the host system.

57. The system of claim 56 wherein the manageability features are provided prior to the host operating system being loaded.

58. The system of claim 56 wherein the manageability features are provided after the host operating system has been loaded.

59. The system of claim 56 wherein the manageability features are provided concurrently with loading of the host operating system.

60. The system of claim 56 wherein the manageability features comprise host operating system independent update of a flash memory device via the embedded controller agent.

61. The system of claim 56 wherein the manageability features comprise monitoring of host functionality and reporting to a remote device via the embedded controller agent.

62. The system of claim 56 wherein the manageability features comprise providing boot services to the host system via the embedded controller agent.

63. The system of claim 53 wherein the embedded controller agent and the embedded firmware agent interact to provide security features to the host system.

64. The system of claim 63 wherein the security features are provided prior to the host operating system being loaded.

65. The system of claim 63 wherein the security features are provided after the host operating system has been loaded.

66. The system of claim 63 wherein the security features are provided concurrently with loading of the host operating system.

67. The system of claim 63 wherein the security features comprise performing verification of the host system and selectively reporting results to a remote device via the embedded controller agent.

68. The system of claim 63 wherein the security features comprise performing virus recovery operations via the embedded controller agent.

69. The system of claim 63 wherein the security features comprise providing authentication services for the host system via the embedded controller agent.

70. The system of claim 63 wherein the security features comprise providing support for mutual authentication of a network communication session.

* * * * *

UNITED STATES PATENT AND TRADEMARK OFFICE
CERTIFICATE OF CORRECTION

PATENT NO. : 7,653,727 B2  Page 1 of 1
APPLICATION NO. : 10/809316
DATED : January 26, 2010
INVENTOR(S) : Durham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1195 days.

Signed and Sealed this

Twenty-eighth Day of December, 2010

David J. Kappos
*Director of the United States Patent and Trademark Office*